United States Patent
Lefevre et al.

(10) Patent No.: US 12,531,654 B2
(45) Date of Patent: Jan. 20, 2026

(54) APPARATUS AND METHOD FOR LOW DENSITY PARITY CHECK CODE DECODING

(71) Applicant: Nokia Solutions and Networks Oy, Espoo (FI)

(72) Inventors: Yannick Lefevre, Heverlee (BE); Paul Cautereels, Hingene (BE)

(73) Assignee: Nokia Solutions and Networks Oy, Espoo (FI)

( * ) Notice: Subject to any disclaimer, the term of this patent is extended or adjusted under 35 U.S.C. 154(b) by 556 days.

(21) Appl. No.: 17/885,896

(22) Filed: Aug. 11, 2022

(65) Prior Publication Data

US 2023/0051030 A1 Feb. 16, 2023

(30) Foreign Application Priority Data

Aug. 12, 2021 (EP) ...................................... 21191119

(51) Int. Cl.
*H04L 1/00* (2006.01)
(52) U.S. Cl.
CPC .......... *H04L 1/0057* (2013.01); *H04L 1/0045* (2013.01)
(58) Field of Classification Search
CPC ......... H03M 13/6577; H03M 13/6588; H03M 13/112; H03M 13/1154; H03M 13/616; H03M 13/255
See application file for complete search history.

(56) References Cited

U.S. PATENT DOCUMENTS

| | | | | |
|---|---|---|---|---|
| 5,596,589 A | * | 1/1997 | Thomsen | H03M 13/152 714/759 |
| 6,393,599 B1 | * | 5/2002 | Chan | H04L 27/233 714/797 |
| 6,766,490 B1 | * | 7/2004 | Garrabrant | H03M 13/6312 714/759 |
| 8,990,661 B1 | | 3/2015 | Micheloni et al. | |
| 10,230,396 B1 | | 3/2019 | Micheloni et al. | |

(Continued)

FOREIGN PATENT DOCUMENTS

| | | |
|---|---|---|
| CN | 1539204 A | 10/2004 |
| CN | 101132252 A | 2/2008 |
| CN | 109478895 A | 3/2019 |

OTHER PUBLICATIONS

Li Mao-Euei et al. "A low complexity LDPC decoder for NAND flsh applications", Proc., IEEE International Symposium on circuits and systems (ISCAS), IEEE, Jun. 1, 2014 (Jun. 1, 2014), pp. 213-216.

(Continued)

*Primary Examiner* — Yee F Lam
(74) *Attorney, Agent, or Firm* — Harness, Dickey & Pierce, P.L.C.

(57) ABSTRACT

Apparatus and method for low density parity check code decoding in a first processing device, wherein the method includes receiving a first bit-word of a first length related to a log-likelihood ratio of a bit of a signal; obtaining a second bit-word of a second length that is shorter than the first length, wherein obtaining the second bit-word comprises applying a correction to the first bit-word; and determining a message depending on a set of second bit-words, wherein the set of second bit-words includes the second bit-word.

11 Claims, 8 Drawing Sheets

(56) References Cited

U.S. PATENT DOCUMENTS

| | | | |
|---|---|---|---|
| 2003/0007577 A1* | 1/2003 | Shiu | H03M 13/2957 |
| | | | 714/794 |
| 2003/0023917 A1* | 1/2003 | Richardson | H03M 13/6502 |
| | | | 714/779 |
| 2005/0204271 A1 | 9/2005 | Sharon et al. | |
| 2010/0122139 A1* | 5/2010 | Wang | H04L 1/0057 |
| | | | 714/752 |
| 2010/0268918 A1* | 10/2010 | Priewasser | H03M 13/6513 |
| | | | 712/E9.016 |
| 2011/0254714 A1* | 10/2011 | Salvekar | H04L 1/0055 |
| | | | 341/94 |
| 2012/0023383 A1* | 1/2012 | Maehata | H03M 13/1134 |
| | | | 714/752 |
| 2012/0221914 A1* | 8/2012 | Morero | H03M 13/112 |
| | | | 714/752 |
| 2014/0281823 A1* | 9/2014 | Micheloni | H03M 13/1111 |
| | | | 714/773 |
| 2015/0082116 A1 | 3/2015 | Kyung et al. | |
| 2016/0105199 A1 | 4/2016 | Wu et al. | |
| 2017/0134048 A1 | 5/2017 | Inbar et al. | |
| 2019/0155688 A1* | 5/2019 | Kumar | H03M 13/45 |

OTHER PUBLICATIONS

Abu-Surra Shadi et al. "Low-power dual quantization-domain decoding for LDPC codes", Proc., IEEE Global Communications Conference, Dec. 8, 2014 (Dec. 8, 2014), pp. 3151-3156.

European Search Report for European Patent Application No. 2119119 dated Jan. 12, 2022.

Office Action for European Application No. 21 191 119.3 dated Jun. 3, 2024.

Office Action issued in European Patent Application No. 21191119.3 dated May 8, 2025.

Fatang, et al. "Low Complexity Offset min-sum algorithm for 5G low density parity check codes" Journal of computer Application, 2020.

Chinese Office Action issued in Chinese Patent Application No. 202210955912.9 dated Sep. 24, 2025.

* cited by examiner

| 104 | 108 | 112 |
|---|---|---|
| 0111 | 0111 | 011 |
| 0110 | 0110 | 010 |
| 0101 | 0101 | 001 |
| 0100 | 0100 | 000 |
| 0011 | 0011 | |
| 0010 | 0010 | |
| 0001 | 0001 | |
| 0000 | 0000 | |

| 0111 |
| 0110 |
| 0101 |
| 0100 |
| 0011 |
| 0010 |
| 0001 |
| 0000 |

408

| 011 |
| 010 |
| 001 |
| 000 |

APPARATUS AND METHOD FOR LOW DENSITY PARITY CHECK CODE DECODING

CROSS-REFERENCE TO RELATED APPLICATIONS

This application claims priority to and the benefit of European Patent Application No. 21191119.3 filed on Aug. 12, 2021, the entire contents of each of which are incorporated herein by reference.

FIELD OF THE DISCLOSURE

Various example embodiments relate to an apparatus and a method for low density parity check code decoding.

BACKGROUND

Low density parity check (LDPC) codes are forward error correction codes that are used to correct bit errors that occur during a transmission of data over a physical medium.

SUMMARY

Various embodiments of the disclosure are set out by the independent claims. The method and apparatus according to the independent claims are already incorporating a correction in variable-node to check node-messages. Because practical implementations of LDPC decoders represent values with limited size bit-words and because messages are represented by shorter bit-words compared to total log likelihood ratio values, the method and apparatus according to the independent claims make better use of available levels of bit-words in a LDPC code decoding process and therefor improve the performance of the LDPC decoding process.

A method for low density parity check code decoding in a first processing device, disclosed herein, comprises receiving a first bit-word of a first length related to a log-likelihood ratio of a bit of a signal; obtaining a second bit-word of a second length that is shorter than the first length, wherein obtaining the second bit-word comprises applying a correction to the first bit-word; determining a message depending on a set of second bit-words, wherein the set of second bit-words includes the second bit-word.

In one aspect of the disclosure, applying the correction comprises mapping the first bit-word to an intermediate bit-word of the first length, wherein a value represented by the intermediate bit-word is a fraction of a value represented by the first bit-word.

In one aspect of the disclosure, applying the correction comprises mapping the first bit-word to an intermediate bit-word of the first length, wherein a magnitude of a value represented by the intermediate bit-word is a magnitude of a value represented by the first bit-word subtracted by an offset.

In one aspect of the disclosure, applying the correction comprises looking up the second bit-word in a table that includes a mapping of the first bit-word to the second bit-word, wherein the mapping comprises the correction.

The method may comprise determining a sign of the message depending on a product of signs of second bit-words in the set of second bit-words, and determining a magnitude of the message depending on a smallest magnitude of the second bit-words in the set of second bit-words.

The method may comprise determining the first bit-word depending on a difference between a total log-likelihood ratio and a previously calculated message.

An apparatus for low density parity check code decoding, comprises means for: receiving a first bit-word of a first length related to a log-likelihood ratio of a bit of a signal; obtaining a second bit-word of a second length that is shorter than the first length, wherein obtaining the second bit-word comprises applying a correction to the first bit-word; determining a message depending on a set of second bit-words, wherein the set of second bit-words includes the second bit-word.

In one aspect of the disclosure, the apparatus comprises means that, to apply the correction, are configured for mapping the first bit-word to an intermediate bit-word of the first length, wherein a value represented by the intermediate bit-word is a fraction of a value represented by the first bit-word.

In one aspect of the disclosure, the apparatus comprises means that, to apply the correction, are configured for mapping the first bit-word to an intermediate bit-word of the first length, wherein a magnitude of a value represented by the intermediate bit-word is a magnitude of a value represented by the first bit-word subtracted by an offset.

In one aspect of the disclosure, the apparatus comprises means that, to apply the correction, are configured for looking up the second bit-word in a table that includes a mapping of the first bit-word to the second bit-word, wherein the mapping comprises the correction.

In one aspect of the disclosure, the apparatus comprises means that are configured for determining a sign of the message depending on a product of signs of second bit-words in the set of second bit-words, and determining a magnitude of the message depending on a smallest magnitude of the second bit-words in the set of second bit-words.

In one aspect of the disclosure, the apparatus comprises means that are configured for determining the first bit-word depending on a difference between a total log-likelihood ratio and a previously calculated message A non-transitory computer readable medium, disclosed herein, comprises program instructions for causing an apparatus to perform at least the method.

BRIEF DESCRIPTION OF THE FIGURES

FIG. 3 depicts first exemplary bit-words, FIG. 4 schematically depicts parts of a second embodiment of the apparatus for low density parity check code decoding.

DESCRIPTION OF THE EMBODIMENTS

An LDPC code is a block code that takes K information bits and encodes them into a codeword of N bits, which in an example disclosed herein, includes the K information bits in addition to N-K parity bits. A code rate R of the LDPC code is R=K/N.

Examples of technologies that use LDPC code comprise wireless technologies, e.g. 5G, coaxial cable technologies, e.g. DOCSIS 3.1, Digital Subscriber Line technologies, e.g. MGfast, Passive Optical Network technologies, e.g. IEEE802.3ca and G.9804.2, power-line technologies, e.g. G.hn.

An LDPC codeword comprises K information bits that correspond to information, e.g. data bits. The LDPC codeword comprises N-K bits that correspond to the N-K redundant parity bits. In the example, the first K bits in an order of the N bits of the LDPC codeword correspond to the K information bits and the last N-K bits in the order correspond to the parity bits.

The characteristics of the LDPC are described by a binary (N-K)×N parity check matrix H. The matrix H comprises N columns that correspond to the N bits of the LDPC codeword. The matrix H comprises N-K rows that correspond to check constraints that any valid codeword of the LDPC code should satisfy. In some embodiments, the LDPC code may be shortened by setting some information bits to a fixed value of for instance 0, and not transmitting these bits. Similarly, in some embodiments, the LDPC code may be punctured by not transmitting some of the encoded bits. With puncturing and shortening a (N-K)×N parity check matrix H may be used to encode bits into a codeword of N'≤N bits long, which may be non-systematic.

The check constraints in the example are that an XOR-sum of the bits of the LDPC codeword indicated in the row of the parity check matrix has to be 0. Indicated in this context means that the matrix element is 1. This can be formally expressed as a matrix multiplication followed by a modulo-2 operation, e.g.:

$$\mod(H \cdot v, 2) = 0$$

where v is the column vector of the data bits and the parity bits.

The LDPC code may be decoded using iterative belief propagation. Iterative belief propagation takes as input an initial log-likelihood ratios $llr_{in,i}$ of received bits $v_i$ that are calculated based on a received signal. The initial log-likelihood ratio $llr_{in,i}$ is the logarithm of the ratio of a probability P that the bit $v_i$ is a 0 given a received sample $y_i$ to a probability that the bit $v_i$ is a 1 given the received sample $y_i$:

$$llr_{in,i} = \log\left(\frac{P(v_i = 0|y_i)}{P(v_i = 1|y_i)}\right)$$

The log-likelihood ratio $llr_{in,i}$ may also be calculated based on a set of received samples, for instance in case of digital equalization. For punctured bits, the initial log-likelihood ratio $llr_{in,i}$ can be set to 0, for shortened bits to a high positive value. A LDPC code decoding process that is based on belief propagation is an iterative process where messages are send from variable nodes $v_i$ to check nodes $c_j$ and vice versa. The N codeword bits are mapped in the LDPC code decoding process one to one to the variable nodes $v_i$. The check nodes $c_j$ correspond to the N-K check constraints. This means, N-K check nodes $c_j$ are used.

In the example, the belief propagation process is a sum-product algorithm. In the belief propagation process initial log-likelihood ratios $llr_{in,i}$ are assigned to the total log-likelihood ratio $llr_{total,i}^0 = llr_{in,i}$ for the N variable nodes $v_i$. In the belief propagation process, messages are iteratively propagated between the N variable nodes and the N-K check nodes. There are two types of messages: variable-node to check-node messages, which are propagated from the variable nodes to the check nodes, and check-node to variable-node messages, which are propagated from the check nodes to the variable nodes. For each non-zero element in the parity check matrix H there is one message of each type. In the process, an initial value is assigned to each check-node to variable-node messages $m_{out\ i,j}^0 = 0$ for which the corresponding element of the parity check matrix is 1.

Then, the iterative believe propagation process starts, wherein the variable-node to check-node message $m_{in\ i,j}^k$ from variable node $v_i$ into check node $c_j$ is calculated in the kth iteration as:

$$m_{in\ i,j}^k = llr_{total,i}^{k-1} - m_{out\ i,j}^{k-1}$$

Next, the check-node to variable-node messages $m_{out\ i,j}^k$ are computed from the variable-node to check-node messages $m_{in\ i,j}^k$. In the example, the check-node to variable-node messages $m_{out\ i,j}^k$ of a check node $c_j$ to a variable node $v_i$ are determined from all the variable-node to check-node messages to this check node $c_j$ excluding the one coming from variable node $v_i$:

$$m_{out\ i,j}^k = 2\operatorname{atanh}\left(\prod_{l \neq i} \tanh\left(\frac{m_{in\ l,j}^k}{2}\right)\right)$$

Then, the total log-likelihood ratio $llr_{total,i}^k$ of each variable node is updated, e.g. by $$llr_{total,i}^k = \sum_j m_{out\ i,j}^k + llr_{in,i}$$

or $$llr_{total,i}^k = m_{in\ i,j}^k + m_{out\ i,j}^k$$

Here the sign of $llr_{total,i}^k$ corresponds to the currently estimated bit value of bit i in the codeword.

The belief propagation process is repeated iteratively until for instance a valid codeword is obtained, or a fixed number of iterations is reached. The check-node to variable-node messages can be updated in different sequences. Two sequences are: layered scheduling in which the check-node to variable-node messages are updated sequentially (i.e., one check node at a time), and flooded scheduling in which the check-node to variable-node messages of all check nodes are updated in parallel.

In another example, a magnitude of the check-node to variable-node message $m_{out\ i,j}^k$ that is sent to a specific variable node is approximated by the, in absolute value, smallest magnitude of the received variable-node to check-node messages $m_{in\ i,j}^k$ excluding the message received from the variable node $v_i$ that the check-node to variable-node message $m_{out\ i,j}^k$ will be sent to. The sign of the check-node to variable-node $m_{out\ i,j}^k$ can be calculated as the product of the signs of the relevant variable-node to check-node messages.

This implementation is a min-sum decoder that is mathematically formulated as follows:

$$m^k_{out\,i,j} = \left[\prod_{l \ne i} \text{sign}(m^k_{in\,l,j})\right] \min_{l \ne i}(|m^k_{in\,l,j}|)$$

These approximations overestimate the check-node to variable-node messages in case the magnitude of the smallest messages are similar.

A correction may be applied to compensate for this effect.

An exemplary correction is an attenuated min-sum decoder, where the check-node to variable-node messages are scaled with a factor $\rho < 1$. A corresponding attenuated min-sum algorithm is mathematically formulated as follows:

$$m^k_{out\,i,j} = \left[\prod_{l \ne i} \text{sign}(m^k_{in\,l,j})\right] \rho \min_{l \ne i}(|m^k_{in\,l,j}|)$$

Another exemplary correction is an offset min-sum decoder, where an offset $c_{offset} > 0$ is subtracted from the check node to variable node messages. A corresponding offset min-sum algorithm is mathematically formulated as follows:

$$m^k_{out\,i,j} = \left[\prod_{l \ne i} \text{sign}(m^k_{in\,l,j})\right] \max\left(\min_{l \ne i}(|m^k_{in\,l,j}|) - c_{offset},\, 0\right)$$

Corrected min-sum decoders, such as the attenuated min-sum decoders and offset min-sum decoders, provide a good compromise between decoding complexity and decoding performance.

When implementing the attenuated min-sum algorithm or the offset min-sum algorithm in tailored hardware implementations, minimizing a number of bits to represent the variable-node to check-node messages $m_{in\,i,j}^k$ and/or the check-node to variable-node messages $m_{out\,i,j}^k$ and/or the total llr values $\text{llr}_{total,i}^k$, has a significant impact on the required resources. So especially in hardware implementations, reducing the number of bits to represent the values of the variable-node to check-node messages $m_{in\,i,j}^k$ and/or the check-node to variable-node messages $m_{out\,i,j}^k$ and/or the total llr values $\text{llr}_{total,i}^k$, is key to obtain a performant and cost effective solution.

In corrected min-sum decoders, the correction, which may be for example an attenuation or an offset, is conventionally applied after the min-operation. As a consequence, the check-node to variable-node messages $m_{out\,i,j}^k$ do not use the full range of values that are available due to the bit-representation of these messages in hardware implementations.

Applying the correction earlier in the processing, enables the check-node to variable-node messages to use the full range of values that are available.

Whether a variable-node to check-node message $m_{in\,i,j}^k$ is sent from a variable node $v_i$ to a check nodes $c_j$ and/or a check-node to variable-node message $m_{out\,i,j}^k$ is sent from a check nodes $c_j$ to a variable node $v_i$ depends on the structure of the LDPC code. In the example, a nonzero entry in the N-K rows of the parity-check matrix H that comprise the check constraint defines that a variable-node to check-node message $m_{in\,i,j}^k$ is sent from a variable node $v_i$ to a check node $c_j$ and that a check-node to variable-node message $m_{out\,i,j}^k$ is sent from the check nodes $c_j$ to the variable node $v_i$. The variable nodes $v_i$ are represented by the columns of the matrix H. The check nodes $c_j$ are represented by the rows of the matrix H. The variable-node to check-node message $m_{in\,i,j}^k$ is sent from the variable node $v_i$ to the check nodes $c_j$ and the check-node to variable-node message $m_{out\,i,j}^k$ is sent from the check node $c_j$ to the variable node $v_i$ if the matrix element of the matrix H in the corresponding row and column is nonzero. Otherwise, no message is exchanged between these nodes.

Figure 1:
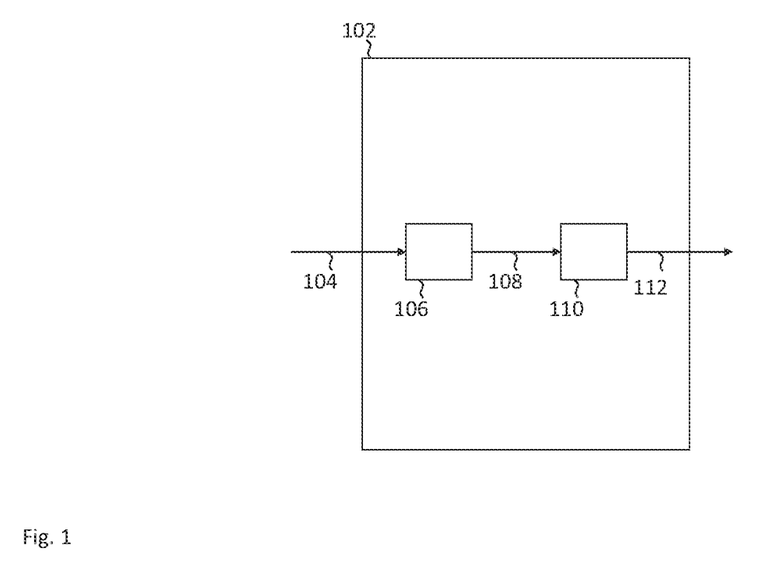
FIG. 1 schematically depicts parts of a first embodiment of an apparatus for low density parity check code decoding.

FIG. 1 depicts schematically a first embodiment of an apparatus 102 for LDPC code decoding.

The apparatus according to the first embodiment 102 is configured for receiving a first bit-word 104 of a first length, related to a log-likelihood ratio of a bit of a signal.

The apparatus 102 according to the first embodiment is configured for mapping the first bit-word 104 in a first operation 106 to an intermediate bit-word 108 of the first length.

In the example, the first operation 106 comprises determining the intermediate bit-word 108 as a fraction of the first bit-word 104. In the context of this disclosure, the fraction refers to a fraction of the value represented by the bit-word and is smaller than 1. The fraction may be determined by a binary shift operation or by a sum of several binary shift operations that are performed on the part of the first bit-word 104 that represents the magnitude.

The fraction may be determined by mapping the first bit-word 104 to the intermediate bit-word 108 with a predetermined map. The map preferably defines a one-to-one mapping of any possible first bit-word to one intermediate bit-word. Several first bit-words may be mapped to the same intermediate bit-word.

The mapping of the first bit-word 104 to the intermediate bit-word 108 may comprise looking up the intermediate bit-word 108 in a first table that includes a mapping of the first bit-word 104 to the intermediate bit-word 108.

The apparatus according to the first embodiment 102 is configured for mapping the intermediate bit-word 108 in a second operation 110 to a second bit-word 112. In the example, the second operation 110 comprises determining the second bit-word 112 to have less bits than the intermediate bit-word 108. The second operation 110 may comprise mapping the intermediate bit-word 108 to the second bit-word 112 according to a predetermined map. The map preferably defines a one-to-one mapping of any possible intermediate bit-word to one second bit-word. Several intermediate bit-words may be mapped to the same second bit-word.

The mapping of the intermediate bit-word 108 to the second bit-word 112 may comprise looking up the second bit-word 112 in a second table that includes a mapping of the intermediate bit-word 108 to the second bit-word 112.

This means, the apparatus according to the first embodiment 102 is configured for mapping the first bit-word 104 to the second bit-word 112. The second bit-word 112 is of a second length that is shorter than the first length.

The apparatus according to the first embodiment 102 is configured for storing the second bit-word 112 to a memory. Aspects of processing of the second bit-word 112 are described below.

The apparatus according to the first embodiment 102 may comprise a non-transitory computer readable medium storing program instructions and at least one processor. The at least one processor is configured to execute the instructions and cause the first apparatus to perform steps in a first method for low density parity check code decoding described below. The non-transitory computer readable medium may also store any of the tables (e.g., look-up tables) for performing the mapping operations. Alternatively, the apparatus may be implemented in alternative forms of processing circuitry such as described below with respect to FIGS. 7 and 8.

Figure 2:
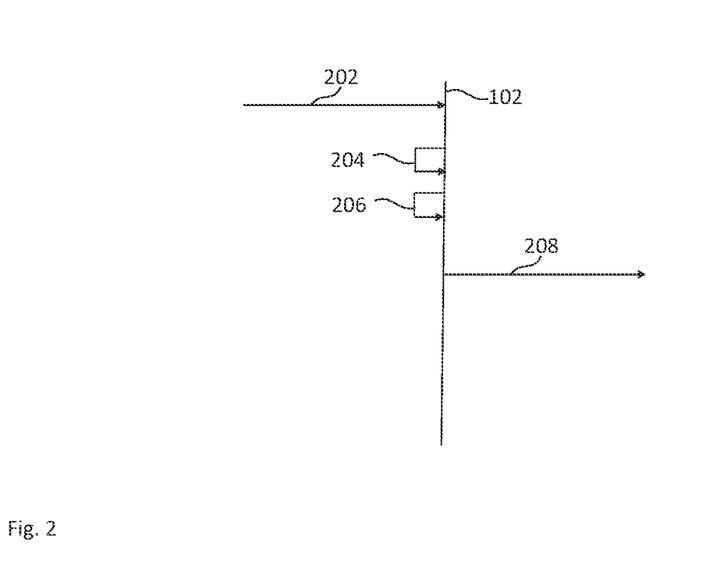
FIG. 2 depicts a sequence diagram comprising steps in a first embodiment of a method for use in low density parity check code decoding.

The first method is described below with reference to FIG. 2.

The first method comprises a step 202.

In step 202 the first bit-word 104 of the first length is received.

Afterwards, a step 204 is executed.

In the step 204, the first bit-word 104 is mapped with the first operation 106 to the intermediate bit-word 108 of the first length.

The intermediate bit-word 108 may be a fraction or an, in magnitude, offset value of the first bit-word 104.

Afterwards, a step 206 is executed.

In the step 206 the intermediate bit-word 108 is mapped with the second operation 110 to the second bit-word 112.

Afterwards, a step 208 is executed.

In the step 208, the second bit-word 112 is stored.

Aspects of processing the second bit-word 112 are described below.

Figure 3:
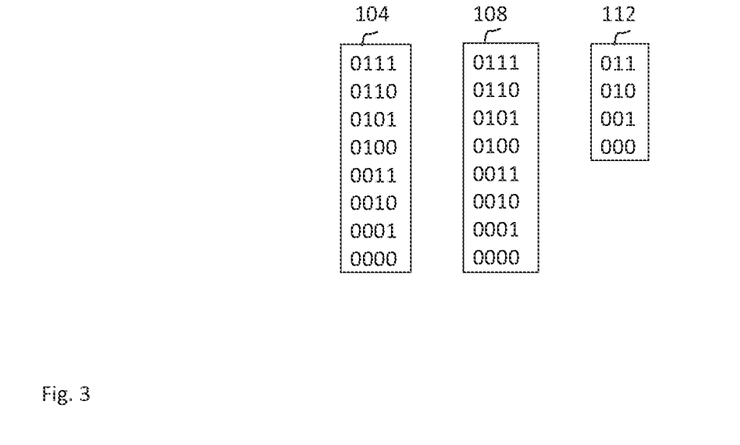

FIG. 3 depicts first exemplary bit-words, wherein the first bit-word 104 and the intermediate bit-word 108 have 4 bits and the second bit-word 112 has three bits. In FIG. 3, only the positive values are depicted. Only bit-words in which the first bit, or sign bit, is a 0, and which thus represent positive messages are shown. The first bit in the bit-word is the sign bit, and if it is one then the value is negative. There also exists bit words for negative values. These bit-words represent messages between the variable nodes $v_i$ and the check nodes $c_j$. The length of the bit-words between the respective nodes, are of less length than the bit-words that are processed in the variable nodes. This reduces the resources that are required for communication significantly.

Figure 4:
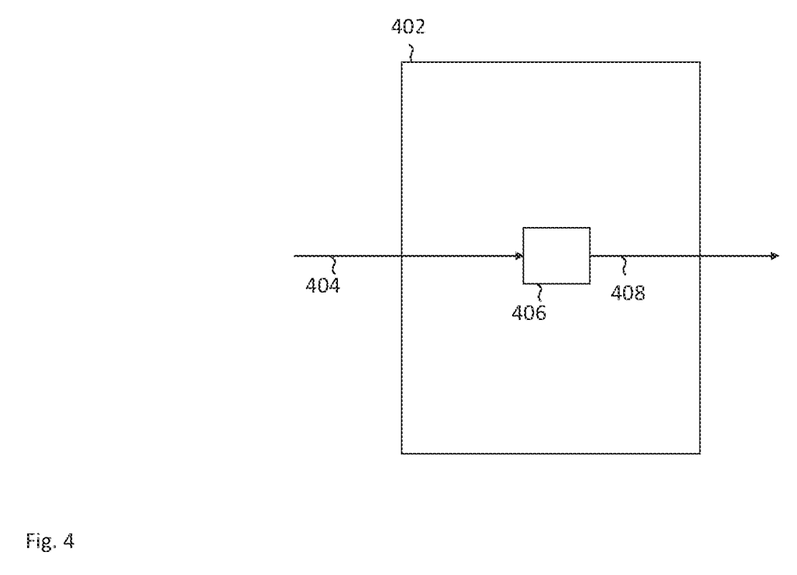

FIG. 4 depicts schematically a second embodiment 402 of the apparatus for LDPC code decoding.

The apparatus according to the second embodiment 402 is configured for receiving a first bit-word 404 of a first length.

The apparatus according to the second embodiment 402 is configured for mapping the first bit-word 404 in a first operation 406 to a second bit-word 408 while applying a correction. In the example, the first operation 406 comprises determining the second bit-word 408 to have less bits than the first bit-word 404. The first operation 406 may comprise mapping the first bit-word 404 to the second bit-word 408 according to a predetermined map comprising a correction. The map preferably defines a one-to-one mapping of any possible first bit-word to one second bit-word. Several first bit-words may be mapped to the same second bit-word.

The mapping of the first bit-word 404 to the second bit-word 408 may comprise looking up the second bit-word 408 in a table that includes a mapping of the first bit-word 404 to the second bit-word 408 while applying a correction.

This means, the apparatus according to the second embodiment 402 is configured for mapping the first bit-word 404 to the second bit-word 408. The second bit-word 408 is of a second length that is shorter than the first length.

The apparatus according to the second embodiment 402 is configured for storing the second bit-word 408 in a memory.

The apparatus according to the second embodiment 402 may comprise a non-transitory computer readable medium comprising program instructions and at least one processor. The at least one processor is configured to execute the instructions and cause the second apparatus to perform steps in a second method for low density parity check code decoding described below. The non-transitory computer readable medium may also store any of the tables (e.g., look-up tables) for performing the mapping operations. Alternatively, the apparatus may be implemented in alternative forms of processing circuitry such as described below with respect to FIGS. 7 and 8.

Figure 5:
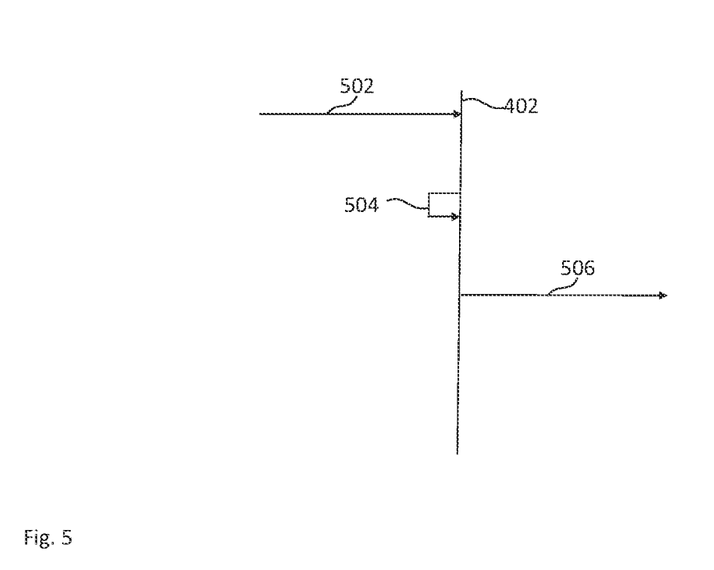
FIG. 5 depicts a sequence diagram comprising steps in a second embodiment of the method for use in low density parity check code decoding.

The second method is described below with reference to FIG. 5.

The second method comprises a step 502.

In step 502 the first bit-word 404 of the first length is received.

Afterwards, a step 504 is executed.

In the step 504, the first bit-word 404 is mapped with the first operation 406 to the second bit-word 408 of the second length. The mapping comprises the correction.

Afterwards, a step 506 is executed.

In the step 506, the second bit-word 408 is stored.

Figure 6:
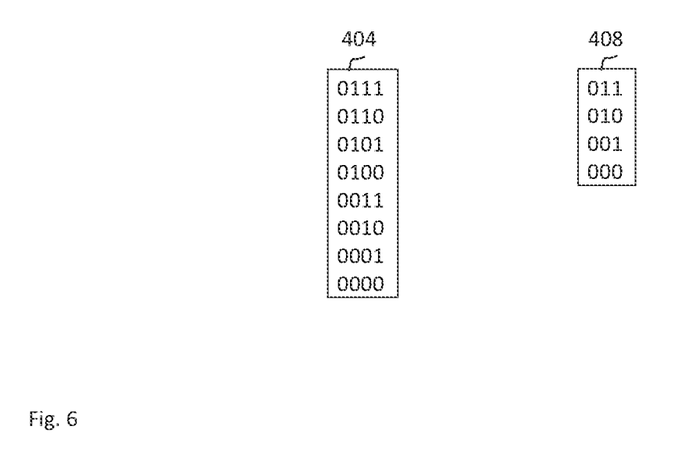
FIG. 6 depicts second exemplary bit-words.

FIG. 6 depicts first exemplary bit-words, wherein the first bit-word 404 has 4 bits and the second bit-word 408 has three bits. In FIG. 6, only the positive values are depicted. Only bit-words in which the first bit, or sign bit, is a 0, and which thus represent positive messages are shown. The first bit in the bit-word is the sign bit, and if it is one then the value is negative. There also exists bit words for negative values. These bit-words represent messages between the variable nodes $v_i$ and the check nodes $c_j$. The length of the bit-words that are exchanged between the respective nodes, are of less length than the bit-words representing for instance total llrs that are processed in the variable nodes. This reduces the resources that are required for communication significantly.

Generally, the bit-words may represent signed values in various representation formats, like e.g., sign-magnitude representation or two's-complement representation. 404 only represents the positive values of the mentioned representation formats.

For mapping, a linear mapping may be used, for example 0000 corresponds to 0, 0001 to 1, 0010 to 2, 0011 to 3, 0100 to 4, 0101 to 5, 0110 to 6, 0111 to 7.

For mapping, a nonlinear mapping may be used, for example, 000 corresponds to 0, 001 to 1, 010 to 3, and 011 to 5.

With this approach the range of the messages can be further increased considerably. This is implemented by for instance implementing a block for performing the second operation based on a look up table that yields a correct magnitude of the output message levels based on the magnitude of the input messages.

Figure 7:
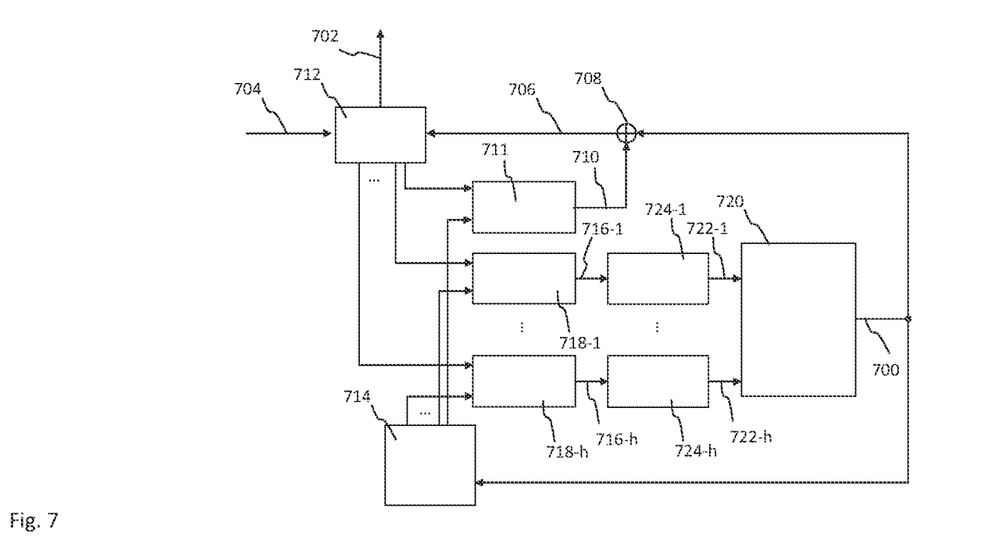
FIG. 7 depicts a first processing to calculate a message corresponding to a variable node and a check node.

FIG. 7 depicts a first processing to calculate a check-node to variable-node message 700 corresponding to one variable node and one check node. The first processing relates to one iteration or update of an LDPC decoder for determining decoded bit values 702 depending on input log likelihood ratios 704.

The decoded bits 702 are the signs of a total log likelihood ratio 706.

The total log likelihood ratio 706 is determined depending on an addition 708 of the check-node to variable-node message 700 with a value 710, that is determined depending on a difference 711 between a previously determined total log likelihood ratio that is sampled from a memory 712 of previously determined total log likelihood ratios and a previously determined check-node to variable-node message that is sampled from a memory 714 of previously determined check-node to variable-node messages. The value 710 and the check-node to variable-node message 700 in the example are values related to the same variable node $v_i$ and the same check node $c_j$, and then their sum 708 is the total log likelihood ratio 706 of this variable node $v_i$.

The check-node to variable-node message 700 is determined depending on a set of first bit-words 716-1, ..., 716-h. The set of first bit-words 716-1, ..., 716-h is determined depending on a respective difference 718-1, ..., 718-h between a respective previously determined total log likelihood ratio that is sampled from the memory 712 of previously determined total log likelihood ratios and a respective previously determined check-node to variable-node message that is sampled from the memory 714 of previously determined check-node to variable-node messages.

The check-node to variable-node message 700 is determined by processing 720 a set of second bit-words 722-1, ..., 722-h according to the configuration provided by the matrix H. The set of second bit-words 722-1, ..., 722-h is determined by applying a respective correction 724-1, ..., 724-h to the respective first bit-words 716-1, ..., 716-h. The first bit-words 716-1, ..., 716-h are bit-words of a first length, and the second bit-words 722-1, ..., 722-h bit-word of a second length. The second bit-words 722-1, ..., 722-h may be determined as described above with reference to FIG. 1 or 4. The set of second bit-words 722-1, ..., 722-h may be provided to processing 720 in respective intermediate messages. In the example, the processing 720 may be configured to select as the magnitude of the check-node to variable-node message 700 the magnitude of the, in absolute value smallest bit-word of the set of second bit-words 722-1, ..., 722-h, and to calculate the sign of its check-node to variable-node message 700 as the product of the signs of the set of second bit-words 722-1, ..., 722-h.

The first processing can be done in parallel or sequential, e.g. by the same processing unit.

Processing can be shared across different variable nodes or check nodes. For example the same first bit-words can be re-used to calculate the check-node to variable-node message for the same check node but for different variable nodes.

The first processing and/or decoder of FIG. 7 may be implemented in processing circuitry such as hardware including logic circuits; a hardware/software combination such as a processor executing software or instruction stored in a non-transitory computer readable medium; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Figure 8:
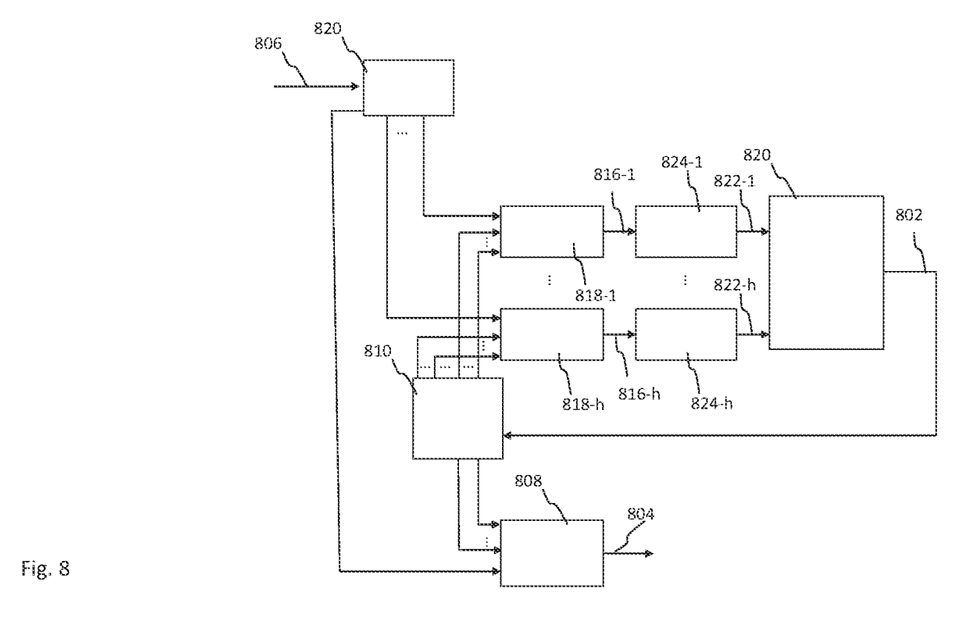
FIG. 8 depicts a second processing to calculate a message corresponding to a variable node and a check node.

FIG. 8 depicts a second processing to calculate a check-node to variable-node message 802 corresponding to one variable node and one check node. The second processing relates to one iteration or update of a LDPC decoder for determining decoded bit values 804 depending on an input log likelihood ratio 806.

The decoded bits 804 are the signs of a total log likelihood ratio. The total log likelihood ratio is determined depending on a sum 808 of a set of check-node to variable-node messages that are sampled from a memory 810 that includes previously determined check-node to variable-node messages and an input log likelihood ratio that is samples from a memory 820 comprising a set of input log likelihood ratios.

The check-node to variable-node message 802 is determined depending on a set of first bit-words 816-1, ..., 816-h. The set of first bit-words 816-1, ..., 816-h is determined depending on a respective sum 818-1, ..., 818-h of a respective input log likelihood ratio that is sampled from a memory 820 comprising a set of input log likelihood ratios and a set of previously determined check-node to variable-node messages that is sampled from the memory 810 of previously determined check-node to variable-node messages.

The check-node to variable-node message 802 is determined by processing 820 a set of second bit-words 822-1, ..., 822-h according to the configuration provided by the matrix H. The set of second bit-words 822-1, ..., 822-h is determined by applying a respective correction 824-1, ..., 824-h to the respective first bit-words 816-1, ..., 816-h. The first bit-words 816-1, ..., 816-h are bit-words of a first length, and the second bit-words 822-1, ..., 822-h are bit-word of a second length. The second bit-words 822-1, ..., 822-h may be determined as described above with reference to FIG. 1 or 4. The set of second bit-words 822-1, ..., 822-h may be provided to processing 820 in respective messages. In the example, the processing 820 may be configured to select as the magnitude of the check-node to variable-node message 800 the magnitude of the, in absolute value smallest bit-word of the set of second bit-words 822-1, ..., 822-h, and to calculate the sign of its check-node to variable-node message 800 as the product of the signs of the set of second bit-words 822-1, ..., 822-h.

The processing can be done in parallel or sequential, e.g. by the same processing unit.

Processing can be shared across different variable nodes or check nodes. For example the same first bit-words can be re-used to calculate the check-node to variable-node message for the same check node and different variable nodes.

The sum 808 may be determined with a separate block or using one of the sum blocks that are used for determining the first bit-words.

The second processing and/or decoder of FIG. 8 may be implemented in processing circuitry such as hardware including logic circuits; a hardware/software combination such as a processor executing software or instruction stored in a non-transitory computer readable medium; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Any non-transitory computer readable medium or memory disclosed herein may be one or more of separate non-transitory computer readable storage medium such as a random access memory, read only memory, register, Universal Serial Bus (USB) flash drive, a memory stick, a Blu-ray/DVD/CD-ROM drive, a memory card, and/or other like computer readable storage media.

The invention claimed is:

1. A method for use in low density parity check code decoding with a min-sum decoder, wherein the method comprises:
receiving a first bit-word of a first length related to a log-likelihood ratio of a bit of a signal;
obtaining a second bit-word of a second length that is shorter than the first length, wherein obtaining the second bit-word comprises applying a correction to the first bit-word;

determining a message depending on a set of second bit-words according to a configuration provided by a parity check matrix, wherein the set of second bit-words includes the second bit-word;

determining a sign of the message depending on a product of signs of second bit-words in the set of second bit-words; and determining a magnitude of the message depending on a smallest magnitude of the second bit-words in the set of second bit-words.

2. The method of claim 1, wherein applying the correction comprises mapping the first bit-word to an intermediate bit-word of the first length, wherein a value represented by the intermediate bit-word is a fraction of a value represented by the first bit-word.

3. The method of claim 1, wherein applying the correction comprises mapping the first bit-word to an intermediate bit-word of the first length, wherein a magnitude of a value represented by the intermediate bit-word is a magnitude of a value represented by the first bit-word subtracted by an offset.

4. The method of claim 1, wherein applying the correction comprises looking up the second bit-word in a table that includes a mapping of the first bit-word to the second bit-word, wherein the mapping comprises the correction.

5. The method of claim 1, comprising: determining the first bit-word depending on a difference between a total log-likelihood ratio and a previously calculated message.

6. An apparatus for low density parity check code decoding with a min-sum decoder, wherein the apparatus comprises:

a non-transitory computer readable medium storing instructions; and at least one processor configured to execute the instructions to cause the apparatus to perform, receiving a first bit-word of a first length related to a log-likelihood ratio of a bit of a signal;

obtaining a second bit-word of a second length that is shorter than the first length, wherein obtaining the second bit-word includes applying a correction to the first bit-word;

determining a message depending on a set of second bit-words according to a configuration provided by a parity check matrix, wherein the set of second bit-words includes the second bit-word;

determining a sign of the message depending on a product of signs of second bit-words in the set of second bit-words; and determining a magnitude of the message depending on a smallest magnitude of the second bit-words in the set of second bit-words.

7. The apparatus of claim 6, wherein the apparatus, to apply the correction, is caused to perform mapping the first bit-word to an intermediate bit-word of the first length, wherein a value represented by the intermediate bit-word is a fraction of a value represented by the first bit-word.

8. The apparatus of claim 6, wherein the apparatus, to apply the correction, is caused to perform mapping the first bit-word to an intermediate bit-word of the first length, wherein a magnitude of a value represented by the intermediate bit-word is a magnitude of a value represented by the first bit-word subtracted by an offset.

9. The apparatus of claim 6, wherein the apparatus, to apply the correction, is caused to perform looking up the second bit-word in a table that includes a mapping of the first bit-word to the second bit-word, wherein the mapping comprises the correction.

10. The apparatus according to claim 6, wherein the apparatus is caused to perform: determining the first bit-word depending on a difference between a total log-likelihood ratio and a previously calculated message.

11. A non-transitory computer readable medium comprising program instructions, which when executed by at least one processor, causes an apparatus including the at least one processor to perform a method for use in low density parity check code decoding with a min sum decoder, the method comprising:

receiving a first bit-word of a first length related to a log-likelihood ratio of a bit of a signal;

obtaining a second bit-word of a second length that is shorter than the first length, wherein obtaining the second bit-word includes applying a correction to the first bit-word;

determining a message depending on a set of second bit-words according to a configuration provided by a parity check matrix, wherein the set of second bit-words includes the second bit-word;

determining a sign of the message depending on a product of signs of second bit-words in the set of second bit-words; and determining a magnitude of the message depending on a smallest magnitude of the second bit-words in the set of second bit-words.

* * * * *